3,456,333
METHOD OF WELDING RAILS TO PRODUCE A PRESTRESSED RAIL
Hermann Meier, Asgardstr. 37, Joseph Eisenmann, Rheinstr. 37, and Ruthard Dohse, Georgenstr. 85, all of Munich, and Wilhelm Ahlert, Heierbusch 48, Essen-Bredeney, Germany
No Drawing. Filed June 7, 1966, Ser. No. 555,711
Claims priority, application Germany, Apr. 6, 1965, E 29,044
Int. Cl. B23k 31/02
U.S. Cl. 29—487        6 Claims

ABSTRACT OF THE DISCLOSURE

In a method of weld uniting rails by a welded joint, differential heating or cooling is employed with respect, on the one hand, to the web of the rail and, on the other hand, to the base and the head of the rail. Compressive stresses are introduced into the base and the head, and tensile stresses are introduced into the web. The stresses in the web thus have a sign which is opposite to that of the stresses in the head and the base.

BACKGROUND OF THE INVENTION

This invention relates, in general, to a method of welding and, in particular, to a method of improving the strength behavior of rail weldings.

Generally, rail connecting welds for tracks are produced by means of alumino-thermic, arc or gas welding methods, the alumino-thermic welding method being used preferably. In welding shops the welding of short rails to greater lengths is generally effected by electrical cutoff butt welding. The advantages resulting from welding rails can be utilized only if sufficient safety of the welded tracks and switches is assured. Apart from constructional requirements, and the correct production of the rail structures, their safety depends therefore in a decisive manner on the quality of the numerous welds which must be made and thus substantially on the safety of the welding method used. The requirements regarding the quality of the welded joints for rails must depend on the demands which result from the load stresses caused by external loads and also on the rail internal inherent stresses caused by external and internal effects, the so-called residual stresses. The load stresses are primarily bending stresses caused by vibrating strains on the weld by the moving wheel loads of railroad cars. The residual stresses which are in equilibrium in size and distribution are caused mainly by a regular heating or cooling of the welds and of the adjacent zones which is inherent in the known welding methods. With the known welding methods, it is likely that there will be a partial elastic deformation of the rail and welding material, and there will be forced heat stresses, generally called shrinkage stresses, the size and distribution of which will depend on the welding method and the climate condition temperature variations in the rails. All of the variables involved in rail welding thus have heretofore resulted in alternating stresses which vary in size and direction.

On the basis of the load conditions, the strength behavior of the welded joints and rails is substantially determined by fatigue load in the fatigue threshold range at a statically effective initial load. The rail foot is exposed to alternating bending and tensile stresses. Since the destruction of the material under a vibrating load starts mostly on an inner or outer surface and faster as such surfaces are in tensile stress fields, fatigue fractures of rail welds usually start from irregularities in the region of the rail foot, such as, for example, by small penetrations or machine notches, by overlappings or variations in the cross section and gas bubbles or slag occlusions.

The fatigue strength of rail welds is therefore below the fatigue strength of unwelded rails. This is true no matter what welding has been used heretofore due to the inherent unavoidable accidental influences and welding mistakes which are likely to occur. The reduction in strength is particularly acute when the irregularities of the rails appear in the region of the rail foot and the foot region is under inherent tensile stresses. Since rail equipment is increasingly stressed in modern times by the increasing demands on its supporting capacity, the requirement for the improved strength and fatigue behavior of the rails becomes more and more necessary.

In accordance with the present invention, the strength of rail welds is improved, particularly in respect to fatigue behavior. This is accomplished by introducing a residual stress into the rail structure as it is being welded, which acts to reduce the load stress deflection. The residual stresses are introduced by the control of temperature distribution in the welding zone particularly in the area of the rail foot, which becomes particularly stressed by the moving wheel loads of the railroad cars by vibratory tension.

In accordance with the preferred method of the invention the residual tensile stresses in the rails are produced during or after the welding in the web region of the weld and in the adjacent weld zones by controlled temperature distribution. The measures according to the invention result, in dependence on the welding method, use, and on the clamping conditions, in the production of inherent compression stresses in the range of the rail head and foot and in the reduction of the residual tensile stresses caused by shrinkage in a longitudinal direction in the same locations. The desired state of inherent residual stress can be obtained in accordance with the invention in different ways.

It was found in accordance with the method of the invention that by taking into consideration the chemical composition and the strength property of the rail and the welding material, an improved state of residual stress, which is in equilibrium in size and distribution, can be obtained by accelerating the cooling of the rail head and rail foot and/or by slowing the cooling in the web region.

Accordingly, it is an object of the invention to provide an improved method of forming welded rail structures which includes controlling the temperature distribution in the welding zone of the rail in order to induce a residual stress therein which counteracts loading stresses.

A further object of the invention is to provide a method of improving the strength behavior, particularly the fatigue strength of rail welds by delaying the cooling in the web region and/or accelerating the cooling in the region of the rail head and rail foot in order to introduce a state of residual strees which reduces the load stress deflection.

A further object of the invention is to provide a method of improving the strength of a rail weld comprising heating the rail particularly in the web region by an exothermic or alumino-thermic compound and/or forming the rail weld with a welding gap which widens in the region of the rail web.

A further object of the invention is to provide a method for forming rail webs which provide an increased strength rail structure which method is simple and economical to execute.

The method according to the invention consists substantially in the production of residual stresses during and after the welding in the web region of the weld and in the adjacent rail zones by controlled temperature distribution. The measures according to the invention result in the production of inherent compressive stresses in the range of the rail head and foot and in a reduction of the residual tensile stresses in such regions caused by shrinkage in the longitudinal direction.

It was found that taking into consideration the chemical composition and strength of the rail, an improved state of residual stress which is in equilibrium in size and distribution can be obtained by accelerating the cooling in the range of the rail head and the rail foot and/or slowing down the cooling in the web region. To this end, the casting mold can be removed after the casting of the rail head and foot immediately after solidification of the welded material. The casting mold is left in the range of the web until it is completely cooled, for example, in the alumino-thermic rail welding method where the rail ends to be welded with each other are surrounded by a casting mold. In such a method, the rail ends are preheated inside the mold and subsequently fused with each other by alumino-thermically produced steel. The mold parts remaining on the web cause a delayed cooling of the web and thus residual tensile stresses in this region due to their heat insulating effect.

Another possibility for improving the state of the residual stress and thus the fatigue behavior consists, according to the invention, in that the finished weld is so heated locally in the web region that an elastic bracing is produced which is characterized by tensile stresses in the range of the web and by compressive stresses and reduced residual stresses in the range of the rail head and foot.

The degree of heating and thus the extent of the elastic bracing depend substantially on the mechanical properties of the material, particularly in respect to the values of the static crack strength and the deformation resistance of rail and welding material. Hence the deformation resistance of steel, which should be low in forced deformations compared to the static crack strength, is increased by alloying, the value of the static crack strength being hardly changed. The amount and control of the heating and the temperature for the heating of the web according to the invention are determined substantially by the amount of the consolidating alloying conditions, particularly by the carbon content of the rail material. The invention therefore includes web heatings from 75° upwardly. Temperature and the size of the residual stresses produced are dependent on tolerable plastic deformation of the material.

The heat supply can be effected in any desired manner. For example, the heat may be supplied by gas or liquid gas-driven burners or electrically by resistance or inductive heating. In a preferred way, the heating is effected in accordance with the invention by the exo-thermic and alumino-thermic compounds. These compounds are arranged in an amount such that they will release heat in their reactions at a predetermined heating rate, duration and temperature in the location of the rail web region. The exo-thermic and alumino-thermic compounds are applied to the web region of the rail for example in the form of heating packs by means of a strap or other similar holding device and they are then ignited. The amount of heat released in the reaction is subsequently transmitted completely automatically to the web region to be heated. The surfaces of the pack not bearing on the rail are preferably protected against waste heat. This method insures that errors in the execution are avoided and that the heating tuned to the respective rail quality will be positively achieved for the production of the desired residual stresses.

The problem can also be solved if the rail weld is produced according to the invention with a welding gap which widens in the range of the rail web. In this manner, a large amount of welding material is introduced in this region which results in greater shrinkage stresses and thus greater residual tensile stresses in the web region as compared to the known rail welding methods.

It was found that the bending strength and the fatigue strength, particularly the fatigue threshold stress, of rail welds can be substantially improved by means of the measures set forth above. By producing compressive stress fields and by the reduction of the residual tensile stresses caused by the welding in the range of the rail foot, irregularities reducing the fatigue strength are limited in their effects so that the danger of fatigue fracture is materially reduced. The rail welds produced or reworked according to the invention in welded tracks or switches permit a greater load and thus at the same time a better utilization of the rail material while showing sufficient safety.

What is claimed is:

1. In the weld uniting of adjacent ends of a pair of rails, each having a foot, a web and a head, by a fusion weld, a method for improving the strength behavior, particularly the fatigue threshold strength, of the weld, comprising the steps of, during cooling of the weld, maintaining the temperature of the web at a higher value than the temperature of the foot and the head, to induce compressive stresses of the same sign in both the foot and the head, and tensile stress, of the opposite sign, in the web.

2. A method according to claim 1, wherein after welding the cooling of the rail in the web region is delayed.

3. A method according to claim 1, wherein the cooling of the rail in the region of the rail head and foot after welding is accelerated.

4. A method according to claim 1, wherein after the welding the finished weld is heated locally in the web region.

5. A method according to claim 1, wherein the rail in the region of the web is heated by exo-thermic and alumino-thermic compounds of a composition adapted to the amount required to effect the induced stressing.

6. A method according to claim 1, wherein the welding is carried out by producing a welding gap which widens in the region of the rail web.

References Cited

UNITED STATES PATENTS

| 1,132,052 | 3/1915 | Wattman | 29—446 |
|---|---|---|---|
| 1,193,238 | 8/1916 | Cook. | |
| 2,039,398 | 5/1936 | Dye | 29—446 |
| 2,299,778 | 10/1942 | Wissler | 29—447 |
| 2,853,775 | 9/1958 | Drake | 29—402 |
| 3,125,804 | 3/1964 | Thome | 29—487 |
| 3,266,956 | 8/1966 | Bennewitz | 148—131 |
| 1,516,407 | 11/1924 | Sandberg | 148—146 X |

JOHN F. CAMPBELL, Primary Examiner

R. B. LAZARUS, Assistant Examiner

U.S. Cl. X.R.

29—447; 104—15; 148—127, 146; 219—101, 137